United States Patent [19]
Kamimae et al.

[11] Patent Number: 5,987,368
[45] Date of Patent: Nov. 16, 1999

[54] SPRUNG- AND UNSPRUNG-STRUCTURE RELATIVE-VELOCITY COMPUTING APPARATUS FOR VEHICLE

[75] Inventors: Hajime Kamimae, Okazaki; Masashi Yamashita, Aichi-ken; Kazunori Yoshida, Nagoya; Hideo Nakai, Owariasahi, all of Japan

[73] Assignee: Toyota Jidosha Kabushiki Kaisha, Toyota, Japan

[21] Appl. No.: 08/861,051

[22] Filed: May 21, 1997

[30] Foreign Application Priority Data

May 22, 1996 [JP] Japan ................................. 8-127562

[51] Int. Cl.$^6$ ................................................ B60G 17/015
[52] U.S. Cl. ...................................... 701/37; 280/5.515
[58] Field of Search ........................ 701/37, 38; 280/5.5, 280/5.507, 5.504, 5.515

[56] References Cited

U.S. PATENT DOCUMENTS

| | | |
|---|---|---|
| 4,830,397 | 5/1989 | Watanabe et al. . |
| 5,360,089 | 11/1994 | Nakamura et al. ...................... 188/299 |
| 5,425,436 | 6/1995 | Teramura et al. ........................ 188/280 |
| 5,434,782 | 7/1995 | Henry . |
| 5,488,556 | 1/1996 | Sasaki .................................. 364/424.05 |
| 5,519,612 | 5/1996 | Winkelman et al. . |
| 5,810,384 | 9/1998 | Iwasaki et al. ............................ 280/707 |
| 5,890,081 | 3/1999 | Sasaki ........................................ 701/37 |

FOREIGN PATENT DOCUMENTS 42 18 087  12/1993  Germany .
6-106937   4/1994   Japan .

OTHER PUBLICATIONS

Patent Abstracts of Japan; JP 06–106937; Jul. 1994; vol. 018, No. 383 (M–1640).

*Primary Examiner*—Michael J. Zanelli
*Attorney, Agent, or Firm*—Kenyon & Kenyon

[57] ABSTRACT

A sprung structure is provided with an acceleration computing section. A damping force estimating section (16) of a relative velocity estimating section (12) estimates a damping force by reading information from a damping force characteristic storing section (14) in accordance with a valve opening degree instruction and the relative velocity between sprung and unsprung structures estimated in the last control cycle. An estimating and computing section 18 estimates the relative velocity between sprung and unsprung structures in accordance with the above acceleration and estimated damping force. A suspension system is controlled in accordance with the relative velocity.

10 Claims, 17 Drawing Sheets

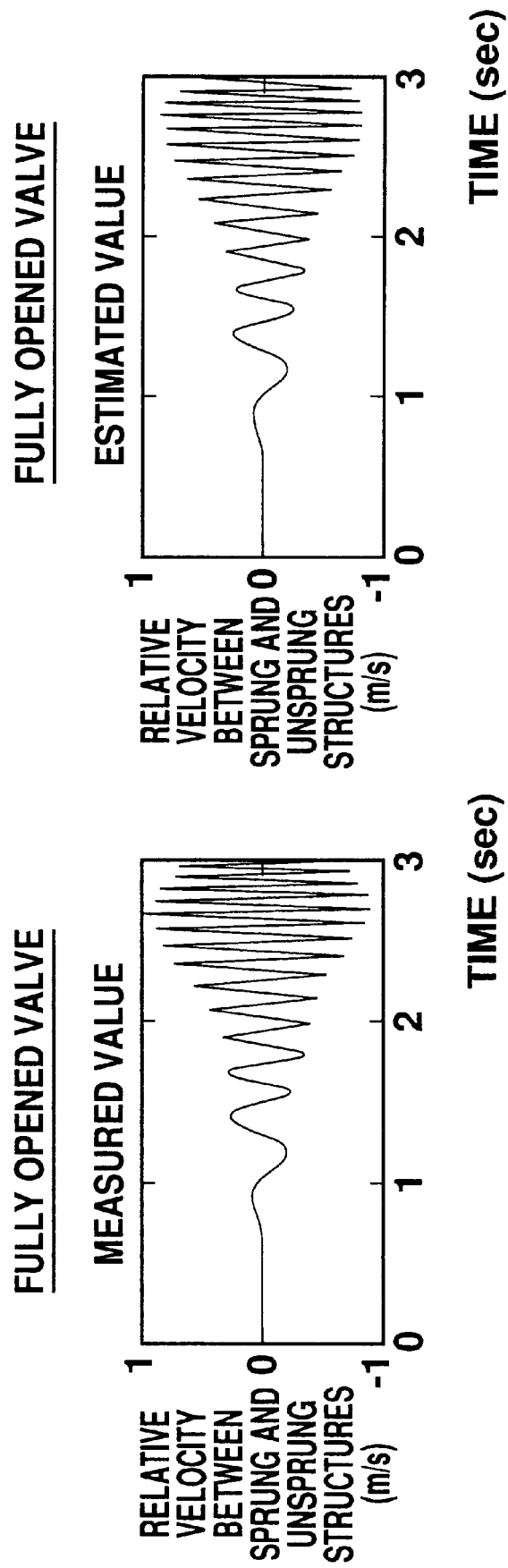

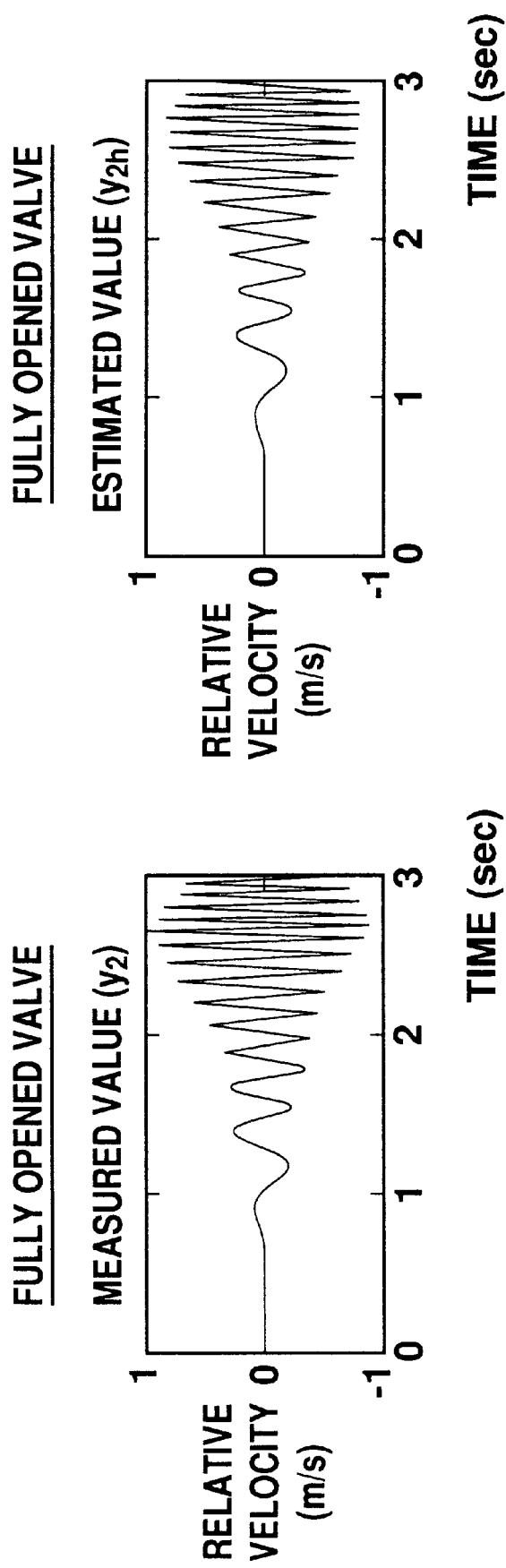

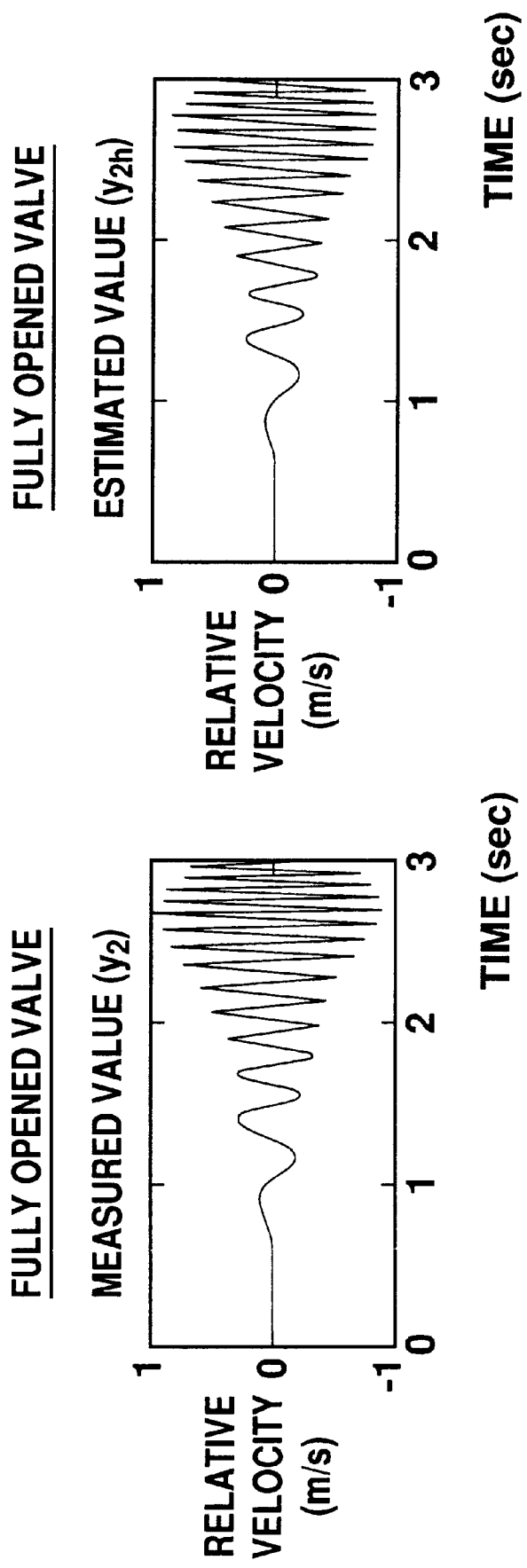

SPRUNG- AND UNSPRUNG-STRUCTURE RELATIVE-VELOCITY COMPUTING APPARATUS FOR VEHICLE

BACKGROUND OF THE INVENTION

1. Field of the Invention

The present invention relates to an apparatus for computing the relative velocity between sprung and unsprung structures constituting factors of damping-force control in a suspension system using a variable damping-force shock absorber.

2. Description of the Prior Art

The suspension of a vehicle is a system for connecting a sprung structure such as a chassis with an unsprung structure such as a wheel, which supports the sprung structure and greatly influences vibration, riding comfort, and maneuvering stability. The suspension includes such parts as a spring for moderating shocks from a road and a shock absorber for damping free vibration of the spring and controlling the velocity of attitude transition of the vehicle. As described above, there are various requirements for the suspension. However, these requirements conflict with each other. Therefore, in the case of design, an attempt is made to find a compromise by considering these requirements.

In order to achieve the above suspension requirements at a high level, a technique is known which makes it possible to vary suspension characteristics. For example, there is a technique for varying the damping forces of a shock absorber in accordance with the state of a vehicle. For example, in a frequency region near a sprung-structure resonance frequency, damping force is increased so as to converge the free vibration in its early stage, otherwise in regions other than the above region, the damping force is decreased so as to absorb an input from the road surface by the suspension much more.

This type of variable damping-force suspension is disclosed in the official gazette of Japanese Patent Laid-Open Publication No. Hei 6-106937. According to the art disclosed in this official gazette, a varying value of the damping force of a shock absorber is obtained to control the damping force by assuming that the damping force is generated proportionally to a certain parameter indicating a vehicle moving state shown by the vertical velocity of a sprung structure. By controlling the damping force, it is possible to decrease the number of sensors needed to detect the vehicle moving state. Moreover, to obtain the parameter showing the vehicle moving state, operations are performed by assuming that each operation factor varies linearly.

As the characteristics of the damping force of a shock absorber, the damping force is generated depending on the velocity of a stroke including the direction and the valve opening degree of an orifice portion. According to the art disclosed in the official gazette, the damping force is generated proportionally to the parameter. Actually, however, the damping force is not generated proportionally to the parameter. Therefore, there is a problem that the damping force cannot necessarily be controlled at a high accuracy. Moreover, there is a problem that the parameter cannot be computed by a linear observer at a high accuracy because each operation factor actually changes in a nonlinear manner.

SUMMARY OF THE INVENTION

The present invention is made to solve the above problems and its object is to provide a sprung- and unsprung-structure relative-velocity computing apparatus for accurately computing a stroke velocity serving as a factor for determining the damping force of a shock absorber, that is to say, the relative velocity between a sprung structure and an unsprung structure in order to perform a high-accuracy control while decreasing the number of sensors for detecting the moving state of a vehicle.

A sprung- and unsprung-structure relative-velocity computing apparatus of the present invention computes the relative velocity between the sprung structure and unsprung structure of a vehicle connected through a shock absorber making it possible to vary damping forces by adjusting the valve opening degree of a fluid channel and a spring and particularly, has the following structures.

(1) A configuration of the present invention has acceleration computing means for computing the vertical acceleration of a sprung structure and relative velocity estimating means for estimating the relative velocity between a sprung structure and an unsprung structure in accordance with the acceleration computed by the acceleration computing means and the valve-opening-degree command value of the orifice portion of a shock absorber.

According to the above structure, it is possible to estimate a relative velocity in accordance with the valve opening degree and the vertical acceleration of the sprung structure. Therefore, because a damping force is obtained in accordance with a valve opening degree serving as one of the factors for determining the damping force of a shock absorber, it is possible to estimate a relative velocity at a high accuracy. Moreover, because it is assumed that a valve opening degree is controlled in accordance with a control command of the valve opening degree of a damping-force-variable shock absorber, it is unnecessary to newly use means for detecting an actual valve opening degree, and therefore the structure is advantageous from the viewpoints of cost and weight.

(2) A preferable structure of relative velocity estimating means has damping-force characteristic storing means, damping-force estimating means, and estimate-computing means. These means will be described below. The damping-force characteristic storing means stores the damping force characteristic of a shock absorber for valve opening degree and stroke velocity in the form of map data. This damping-force characteristic is previously measured. The damping-force estimating means obtains the valve opening degree command for a shock absorber and the relative velocity between a sprung structure and an unsprung structure estimated in the previous control cycle, preferably in the last control cycle, reads the damping force generated at the then valve opening degree and relative velocity from the data stored in the damping-force characteristic storing means, and estimates the read damping force as the present damping force of the shock absorber. In this case, because the relative velocity between the sprung structure and unsprung structure becomes equal to the stroke velocity of the shock absorber, it is possible to use the characteristic stored in the damping-force characteristic storing means. Moreover, the estimate-computing means estimates the relative velocity between the sprung structure and unsprung structure in accordance with the acceleration computed by the acceleration computing means and the damping force estimated by the damping-force estimating means.

According to the above structure, when the damping-force characteristic of a shock absorber for a valve opening degree and velocity are stored, it is possible to estimate a damping force in accordance with the information on a valve opening degree and the relative velocity estimated in the previous control cycle. Moreover, it is possible to estimate the relative velocity in accordance with the estimated damping force and the vertical acceleration of the sprung structure. Therefore, because a damping force is obtained in accordance with a valve opening degree and a relative velocity which are factors for determining the damping force of a shock absorber, it is possible to estimate a relative velocity at a high accuracy.

(3) Another preferable structure of the relative velocity estimating means is provided with vibration characteristic storing means, deviation computing means, amplifying means, and vibration analyzing means. These means will be described below. In the case of the relative velocity estimating means, the deviation of the vertical acceleration of the sprung structure computed by the acceleration computing means from the estimated vertical acceleration of a sprung structure are first computed. The deviation is amplified at a predetermined rate corresponding to the valve opening degree command by the deviation amplifying means. Vibration characteristics of the vehicle are previously stored in the vibration characteristic storing means. The stored vibration characteristics include sprung mass, unsprung mass, and spring constant and are stored as vibration models in accordance with these constants.

The acceleration of a sprung structure and the relative velocity between sprung and unsprung structures are computed by the analyzing means in accordance with the amplified acceleration deviation and the stored vibration models. In this case, the computed acceleration is used for operations by the deviation computing means.

According to the above structure, it is possible to compare the estimated vertical acceleration of the sprung structure with the acceleration computed by the acceleration computing means and reflect the error between both accelerations on subsequent estimation, and moreover to vary the influence of the error on the estimating operation in accordance with a valve opening degree. Thereby, it is possible to compute a more accurate relative velocity.

(4) As still another preferable structure of the relative velocity estimating means is provided with vibration characteristic storing means, deviation computing means, damping-coefficient estimating means, amplifying means, and vibration analyzing means. The damping-coefficient estimating means estimates a damping coefficient based on previously stored damping-force characteristics in accordance with a valve opening degree command and the relative velocity between sprung and unsprung structures estimated in the previous control cycle, preferably the last control cycle. Moreover, the deviation computing means computes the deviation of the vertical acceleration of the sprung structure computed by the acceleration computing means from an estimated vertical acceleration of the sprung structure. The amplifying means amplifies the deviation at a predetermined rate corresponding to a damping coefficient estimated by the damping-coefficient estimating means. Moreover, vibration characteristics of the vehicle are previously stored in the vibration characteristic storing means. The vibration characteristics include sprung mass, unsprung mass, and spring constant and are stored as vibration models in accordance with these constants.

The analyzing means computes the acceleration of a sprung structure and the relative velocity between sprung and unsprung structures in accordance with the amplified acceleration deviation and the stored vibration models. In this case, the computed acceleration is used for the computation by the deviation computing means.

According to the above structure, it is possible to compare an estimated vertical acceleration of a sprung structure with an acceleration computed by the acceleration computing means and reflect the error between both accelerations on the subsequent estimation, and moreover to vary the influence of the error on the estimating operation in accordance with an estimated damping coefficient. Therefore, it is possible to compute a more accurate relative velocity.

(5) In the case of each configuration of the present invention described in (1)–(4), the acceleration computing means can be used as an acceleration sensor for detecting the acceleration of the shock absorber attachment point of the sprung structure. According to this structure, it is possible to use the acceleration detected by the acceleration sensor as the acceleration of the sprung structure.

(6) Moreover, in the case of each configuration of the present invention described in (1)–(4), it is possible to use the acceleration computing means as a structure provided with a plurality of acceleration sensors provided for a sprung structure and attachment-point acceleration computing means for computing the acceleration of the shock absorber attachment point of the sprung structure in accordance with the acceleration detected by the acceleration sensors. The attachment-point acceleration computing means is able to compute the acceleration at the shock absorber attachment point from the position of the center of gravity of a vehicle, the shock absorber attachment point, and acceleration sensor installation positions by means of proportional computation and from the values detected by the acceleration sensors.

By locating two acceleration sensors at the front and the rear, it is possible to detect not only heaving in which the whole of a vehicle (sprung structure) is vertically displaced but also pitching in which the vehicle tilts forward and backward. Moreover, by locating two acceleration sensors at the right and the left, it is possible to detect not only heaving but also rolling in which the vehicle tilts rightward and leftward. Furthermore, by locating three acceleration sensors so that they are not located on the same straight line, it is possible to detect heaving, pitching, and rolling.

BRIEF DESCRIPTION OF THE DRAWINGS

FIG. 9A is an illustration showing a measured value of vehicle vibration, and

FIG. 9B is an illustration showing an estimated value of vehicle vibration computed by assuming that the observer gain L is constant;

FIG. 12A is an illustration showing a measured value of vehicle vibration, and

FIG. 12B is an illustration showing an estimated value of vehicle vibration computed by the apparatus of the present embodiment for changing the observer gain L(q) in accordance with the damping coefficient Cs;

FIG. 15A is an illustration showing a measured value of vehicle vibration, and

FIG. 15B is an illustration showing an estimated value of vehicle vibration computed by the apparatus of the present embodiment for changing the observer gain L(p) in accordance with the valve opening degree ar;

DESCRIPTION OF THE PREFERRED EMBODIMENTS

Figure 1:
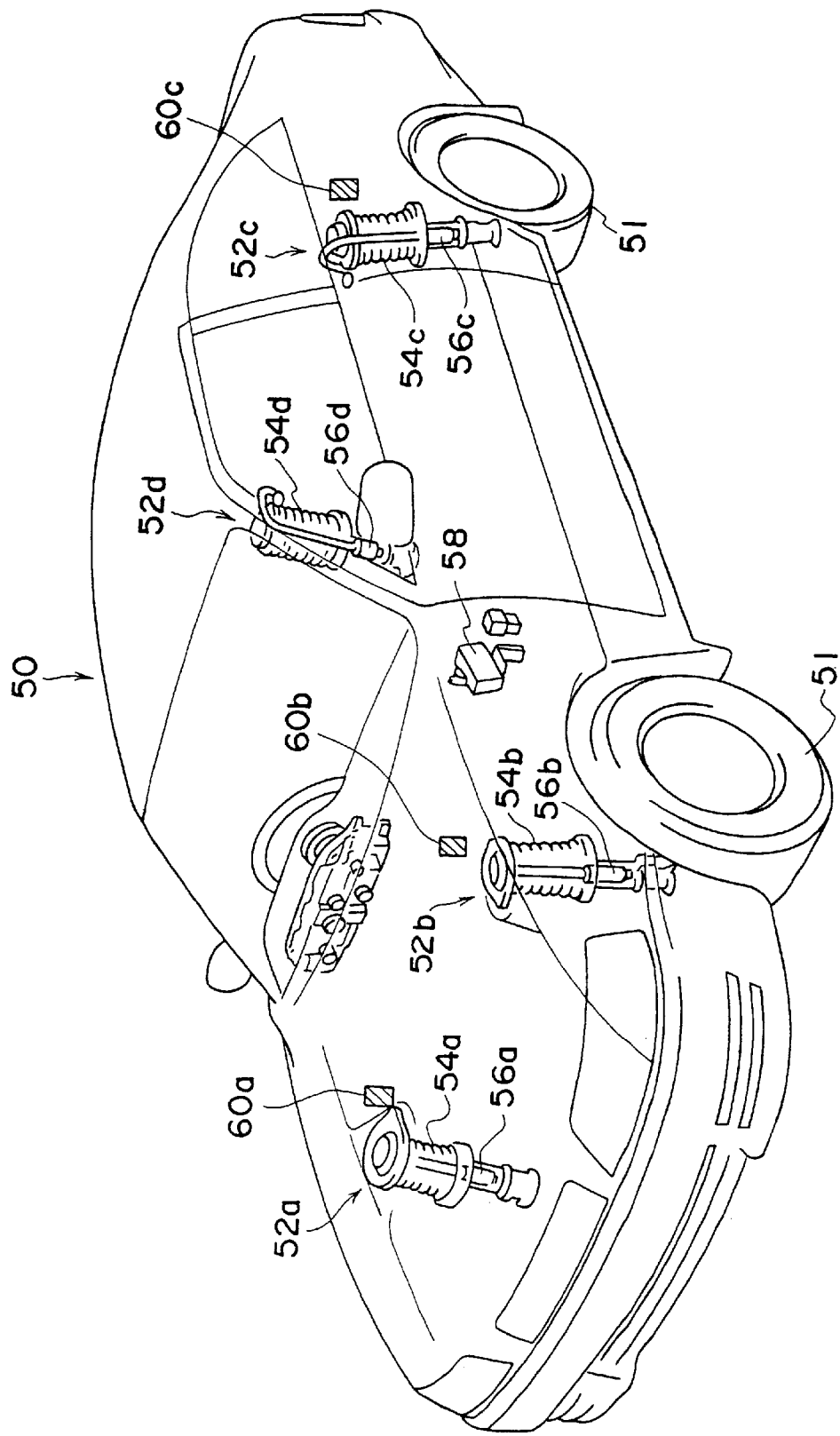
FIG. 1 is an illustration showing the partial layout of a suspension system of a vehicle.

The preferred embodiments of the present invention will be described below by referring to the accompanying drawings. FIG. 1 is an illustration showing the layout of parts of a vehicle provided with a variable-damping-force shock absorber. A chassis 50 serving as a sprung structure is connected with wheels 51 serving as unsprung structures by suspensions including shock absorbing systems 52a, 52b, 52c and 52d. (Four shock absorbing systems are hereafter described with only symbol 52 when it is unnecessary to distinguish between them). The shock absorbing system 52 further includes springs 54a, 54b, 54c and 54d, and shock absorbers 56a, 56b, 56c and 56d. (Four springs and four shock absorbers are hereafter also described with only symbols 54 and 56 when it is unnecessary to distinguish between them.)

The shock absorber 56 generates a damping force using a resistance generated when fluid sealed inside the shock absorber 56 passes through an orifice. This embodiment makes it possible to adjust a damping force by controlling a valve opening degree and thereby varying the channel cross sections of the orifice. That is to say, when the valve opening degree is large and the channel cross section is large, the damping force decreases because the fluid passes smoothly through the channel. However, when the valve opening degree is small, the damping force increases because the fluid resistance increases. The valve opening degree can be varied by an actuator provided in a shock absorber and it is controlled in accordance with an instruction sent from a control unit 58. Moreover, the control unit 58 computes the relative velocity between the chassis 50 and the wheels 51 from the vertical acceleration of a vehicle detected by acceleration sensors 60a, 60b and 60c in accordance with the arithmetic processing to be mentioned later and outputs an instruction to the actuator in accordance with the relative velocity.

Figure 2:
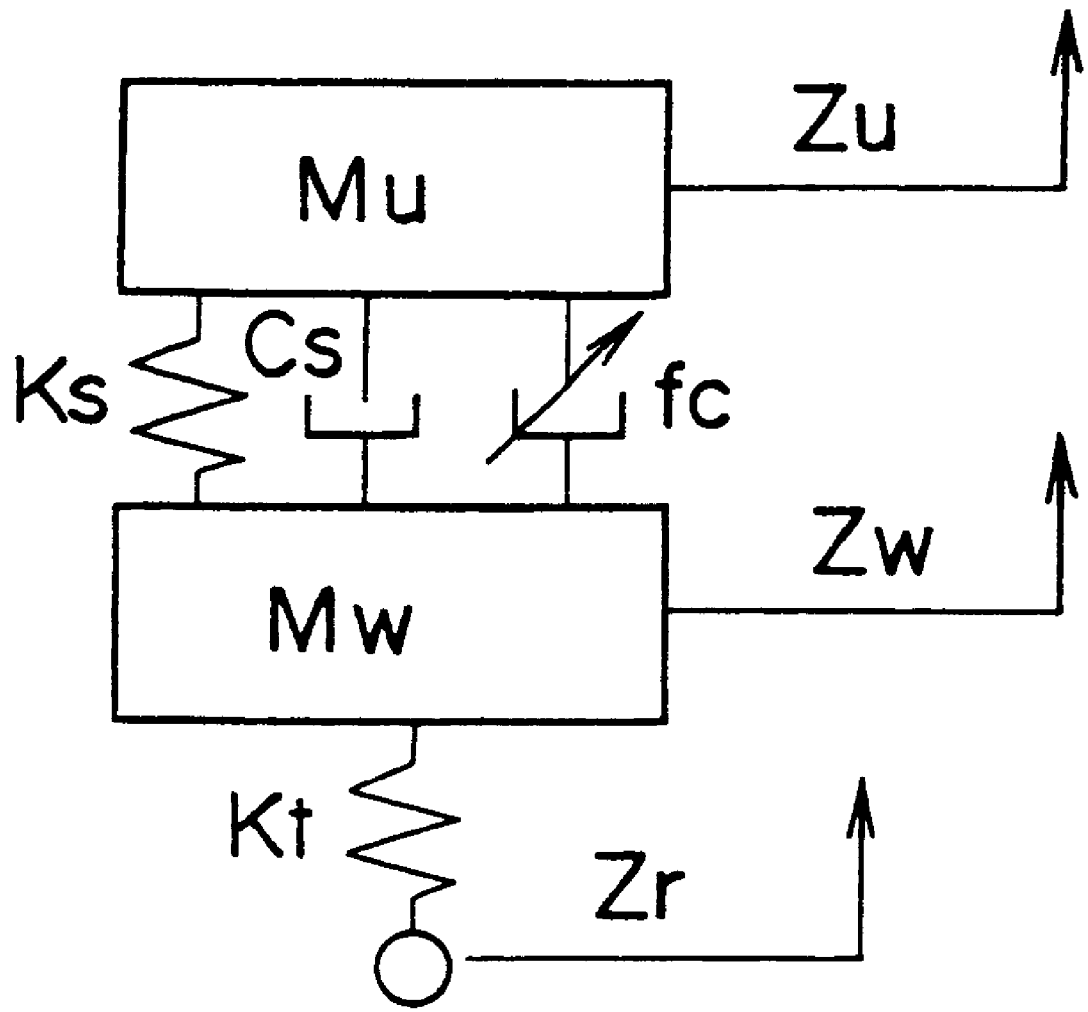
FIG. 2 is an analytic model of vehicle vibration.

FIG. 2 shows a single wheel model including a variable-damping-force shock absorber. In FIG. 2, symbol Mu denotes the mass of a sprung structure (hereafter referred to as sprung mass) and Mw denotes the mass of an unsprung structure (hereafter referred to as unsprung mass). The masses of an arm and the spring 54 constituting a suspension and the shock absorber 5 are distributed to the sprung mass and the unsprung mass at an appropriate ratio. Symbol Ks denotes the spring constant of the spring 56, Kt denotes the spring constant of a tire, Cs denotes the fixed damping force of the shock absorber 56, and fc denotes the variable damping force of a shock absorber. Moreover, symbol Zu denotes the vertical displacement of a sprung structure, Zw denotes the vertical displacement of an unsprung structure, and Zr denotes the displacement of the surface of a road.

Furthermore, in the subsequent description, a symbol ' denotes time differentiation of a variable provided with the symbol and a symbol " denotes double time differentiation. Therefore, Zu' denotes the velocity of a sprung structure and Zu" denotes the vertical acceleration of the sprung structure. Furthermore, a symbol $^T$ denotes the transposed matrix of a matrix provided with the symbol.

The sprung- and unsprung-structure relative-velocity computing apparatus of this embodiment computes the relative velocity between sprung and unsprung structures of a vehicle connected through a shock absorber capable of varying damping forces by adjusting the valve opening degree of a fluid channel and a spring, and particularly has the following structure.

Figure 3:
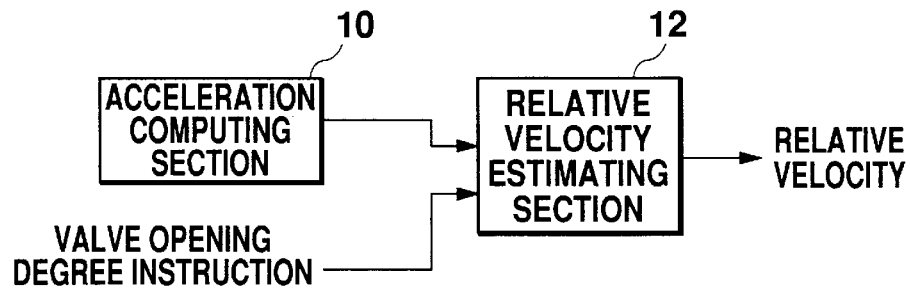
FIG. 3 is a structural block diagram of an embodiment of the present invention.

FIG. 3 is a block diagram of arithmetic processing of the apparatus of this embodiment. Acceleration computing means 10 computes the vertical acceleration of a sprung structure. A relative velocity estimating section 12 estimates the relative velocity between sprung and unsprung structures in accordance with the acceleration computed by the acceleration computing means and the valve-opening-degree command value of the orifice portion of a shock absorber.

Figure 4:
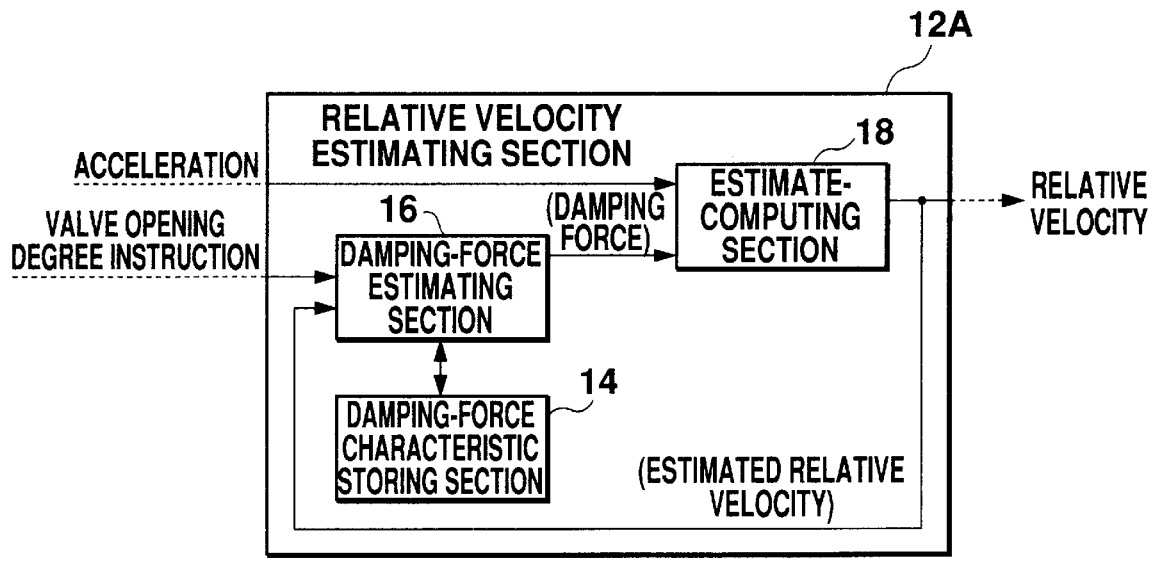
FIG. 4 is a block diagram showing a part of the structure of an embodiment of the present invention.

FIG. 4 shows a relative-velocity estimating section 12A serving as a preferred structure of the relative velocity estimating section 12 shown in FIG. 3. A damping-force characteristic storing section 14 stores the previously measured damping-force characteristics of a shock absorber for a valve opening degree and stroke velocity in the form of the map data shown in FIG. 5. A damping-force estimating section 16 obtains the valve opening degree command for a shock absorber and the relative velocity between sprung and unsprung structures estimated in a previous control cycle, preferably in the last control cycle, reads the damping force generated due to the valve opening degree at that time and relative velocity from the data stored in the damping-force characteristic storing section 14, and estimates the read damping force as the present damping force of the shock absorber. In this case, because the relative velocity between sprung and unsprung structures becomes equal to the stroke velocity of the shock absorber, it is possible to use the characteristics stored in the damping-force characteristic storing section 14. Moreover, an estimate-computing section 18 estimates the relative velocity between sprung and unsprung structures in accordance with the acceleration computed by an acceleration computing section 10 and the damping force estimated by the damping-force estimating section 16.

Specifically, the relative velocity estimating section 12A is a part of the control unit 58. Moreover, the damping-force characteristic storing section 14 is a ROM (read only memory) provided for the control unit 58. Furthermore, the estimate-computing section 18 and the damping-force estimating section 16 are CPUs (central processing units) for performing the above described operations in accordance with a program stored in a ROM or the like.

The arithmetic processing by the relative velocity estimating section 12A will be described below in detail.

When showing the equation of motion of the system in FIG. 2 in the form of a state space expression, the following equation (1) is obtained.

$$x_c' = A_c \cdot x_c + B_c \cdot u + G_c \cdot w \tag{1}$$

wherein $x_c = (Zu' \ Zu \ Zw' \ Zw)^T$, $u = f_c$, $w = Z_f$, and each of $A_c$, $B_c$, and $G_c$ is a coefficient matrix.

This is the state equation of a plant. In this case, $x_c$ denotes a parameter showing a moving state of the system. Moreover, because the vertical acceleration Zu" of a sprung structure is a variable which can be measured in this embodiment, the following equation (2) is obtained as an output equation.

$$y_1 = C_{c1} \cdot x_c + C_{c1} \cdot u + v \tag{2}$$

wherein $y_1 = Zu''$, v is an measurement noise, and each of $C_{c1}$ and $D_{c1}$ is a coefficient matrix.

Moreover, an output equation for computing a relative velocity $y_2$ from a parameter is defined as the following equation (3).

$$y_2 = C_{c2} \cdot x_c + C_{c2} \cdot u \tag{3}$$

wherein $y_2 = Zw' - Zu'$, and each of $C_{c2}$ and $D_{c2}$ is a coefficient matrix.

When the above equations (1) to (3) are represented by discrete systems, the following equations (4) to (6) are obtained.

$$x(k+1) = A \cdot x(k) + B \cdot u(k) + G \cdot w(k) \tag{4}$$

$$y_1(k) = C_1 \cdot x(k) + D_1 \cdot u(k) + v(k) \tag{5}$$

$$y_2(k) = C_2 \cdot x(k) + D_2 \cdot u(k) \tag{6}$$

wherein each of A, B, $C_1$, $C_2$, $D_1$ and $D_2$ is a coefficient matrix.

x(k) denotes a parameter $x_c$ shown in the form of a discrete system.

Figure 6:
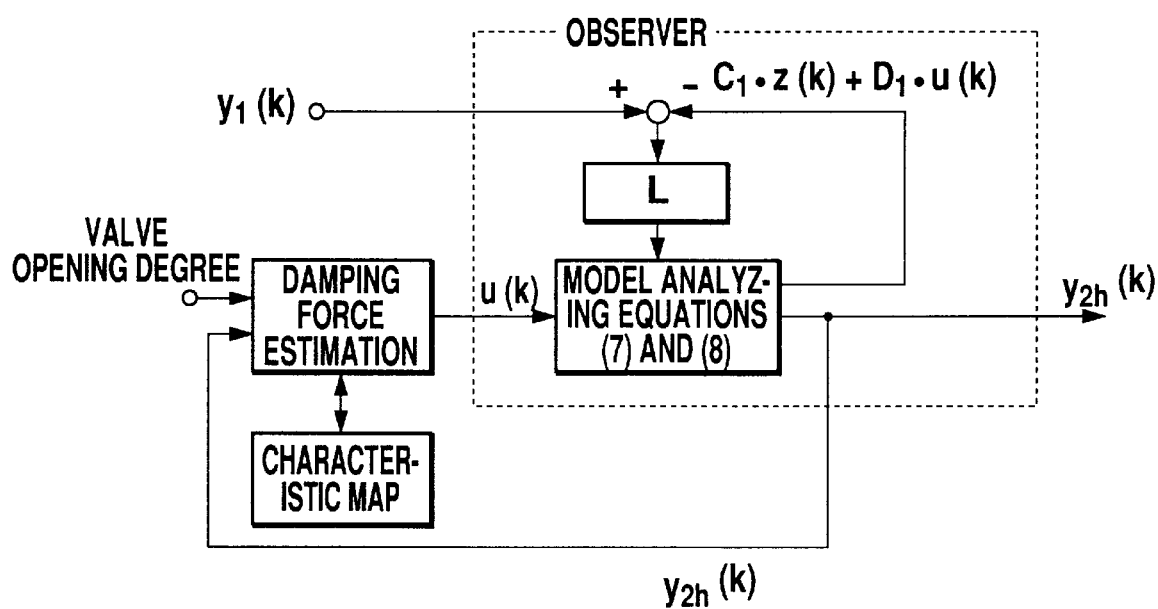
FIG. 6 is a block diagram showing the computation of relative velocity between sprung and unsprung structures.

Then, a state observer for the system for estimating the relative velocity is defined by the following equations (7) and (8).

$$z(k) = (I - L \cdot C_1) A \cdot z(k-1) + L \cdot y_1(k) \tag{7}$$

$$y_{2h}(k) = C_2 \cdot z(k) + D_2 \cdot u(k) \tag{8}$$

wherein z(k) denotes an estimated value of the parameter x(k) computed by the defined state observer. Moreover, $y_{2h}(k)$ denotes an estimated value of a relative velocity $y_2(k)$. FIG. 6 shows a block diagram of the observer defined by the equations (7) and (8).

The symbol L in the equation (7) denotes the gain of a stationary Kalman filter, which can be obtained from the following equations (9) and (10).

$$P = [(APA^T + BVB^T)^{-1} + C^T W^{-1} C]^{-1} \tag{9}$$

$$L = PC_1^T W^{-1} \tag{10}$$

Matrices V and W are design parameters which can be set by a designer in order to improve the estimation accuracy. A symbol P denotes the only positive constant value matrix meeting the equation (9).

In the equations (7) and (8), the coefficient matrixes A, B, $C_1$, $C_2$, $D_1$ and $D_2$ can be obtained from the constants such as the spring constant, sprung mass, and unsprung mass of the system shown in FIG. 2.

Moreover, the vertical acceleration $y_1(k)$ of a sprung structure can be computed in accordance with the output of an acceleration sensor provided on the sprung structure. In the case of the single wheel model shown in FIG. 2, it is possible to provide an acceleration sensor for a sprung structure and directly use the acceleration detected by the sensor as the vertical acceleration $y_1(k)$. In the case of the real vehicle shown in FIG. 1 or the like, it is difficult to set an acceleration sensor 60 to the chassis-side setting point of the shock absorber 56. Therefore, it is necessary to obtain the acceleration of a sprung structure by applying a predetermined correction to a value detected by the acceleration sensor 60. Specifically, three acceleration sensors 60 are arranged so that they are not located on the same straight line and the attitude of a chassis (sprung structure) is obtained from an acceleration at the setting point to perform correction in accordance with the distances between the acceleration sensor and shock absorber attachment points and the center of gravity of the chassis.

For example, when the values detected by three acceleration sensors 60 are equal to each other, it is found that the chassis performs a heaving motion in which all part of the chassis move vertically in parallel. In this case, the detected value can directly be used as the vertical acceleration $y_1(k)$. Moreover, when the outputs of the two acceleration sensors 60a and 60b located close to the front wheels are equal to each other and the phase of this output is reversed to the phase of the output of the acceleration sensor 60c located close to the rear wheels, it is found that the chassis includes a pitching motion. When the chassis performs only a pitching motion, it is only necessary to correct an acceleration sensor output in accordance with the ratio of the distance between the center of gravity of the chassis and an acceleration sensor, to the distance between the center of gravity of the chassis and a shock absorber attachment point, and compute the vertical acceleration $y_1(k)$. The same is true for the case of a rolling motion.

Figure 5:
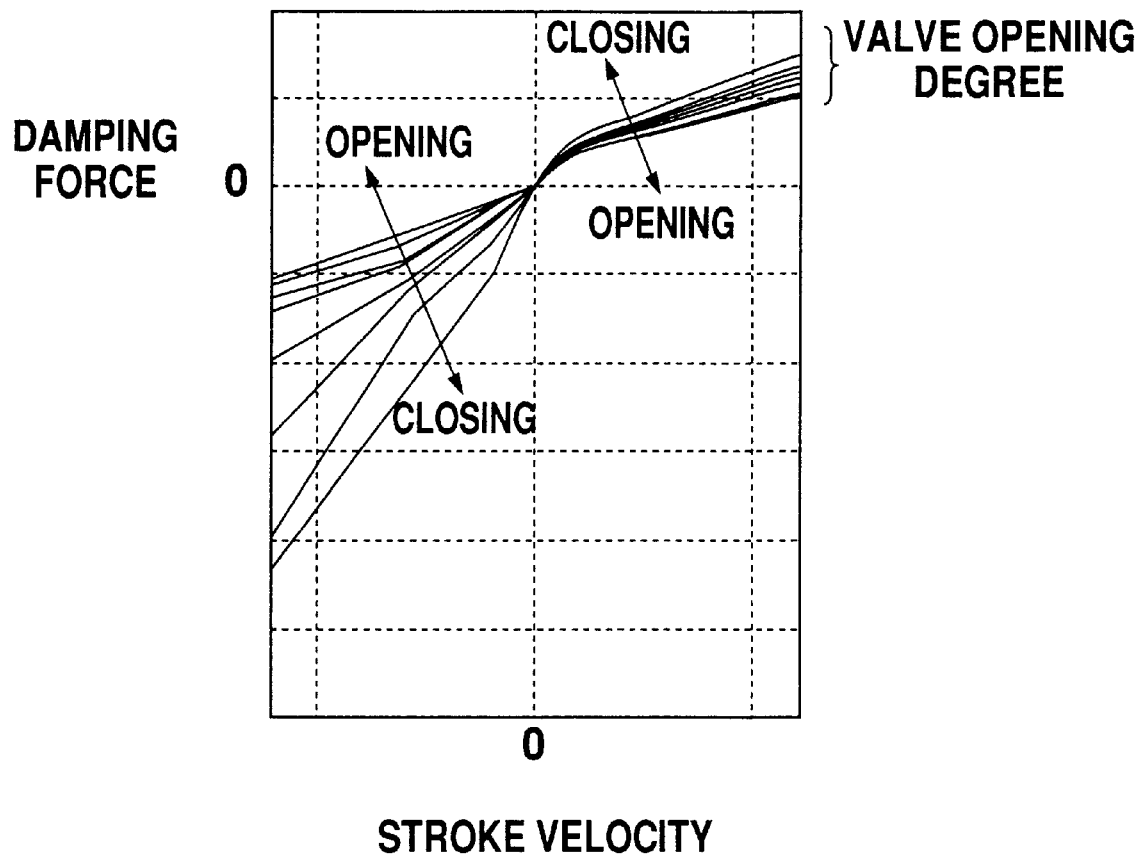
FIG. 5 is an illustration showing an example of damping force characteristics of a shock absorber.

Moreover, a damping force u(k) is estimated from the valve opening degree of a shock absorber and the output $y_{2h}(k)$ of a state observer, that is to say, the estimated relative velocity between sprung and unsprung structures. The valve opening degree uses a valve opening degree command sent from the control unit 58 to each shock absorber 56. Therefore, it is unnecessary to measure an actual valve opening degree, and thus it is unnecessary to use a sensor or the like. Moreover, the relative velocity between sprung and unsprung structures uses the data one control cycle before. When a control cycle is much smaller than the change of the relative velocity between sprung and unsprung structures, it is estimated that the difference between the data one control cycle before and the present actual relative velocity is very small. Furthermore, the damping force characteristic of a shock absorber is previously measured by using a stroke velocity and a valve opening degree as parameters and stored in the form of characteristic map data as shown in FIG. 5. When a valve opening degree and a stroke velocity are known, it is possible to estimate the damping force u(k) of a shock absorber at that time from the characteristic map data. As described above, because the valve opening degree is known from the valve opening degree command and the stroke velocity equals the relative velocity between sprung and unsprung structures, it is possible to estimate the damping force at that time from these pieces of data. Strictly speaking, the estimated damping force is the damping force one control cycle before. However, as described above, when a control cycle is much smaller than the cycle of relative velocity change, it is possible to make the difference between the damping force one control cycle before and its actual value very small. Particularly, for the cycle of the vibration generated in a suspension of a passenger car, approx. 10 Hz, which is the resonance frequency of an unsprung structure, and approx. 1 Hz, which is the resonance frequency of a sprung structure, are predominant. Therefore, by performing control at a frequency much higher (a cycle much shorter) than the above resonance frequencies, the problem caused by using the data one cycle before does not occur.

The relative velocity $y_{2h}(k)$ is estimated by using the above described vertical acceleration $y_1(k)$ of a sprung structure and the damping force u(k) in accordance with the equations (7) and (8).

Figure 7:
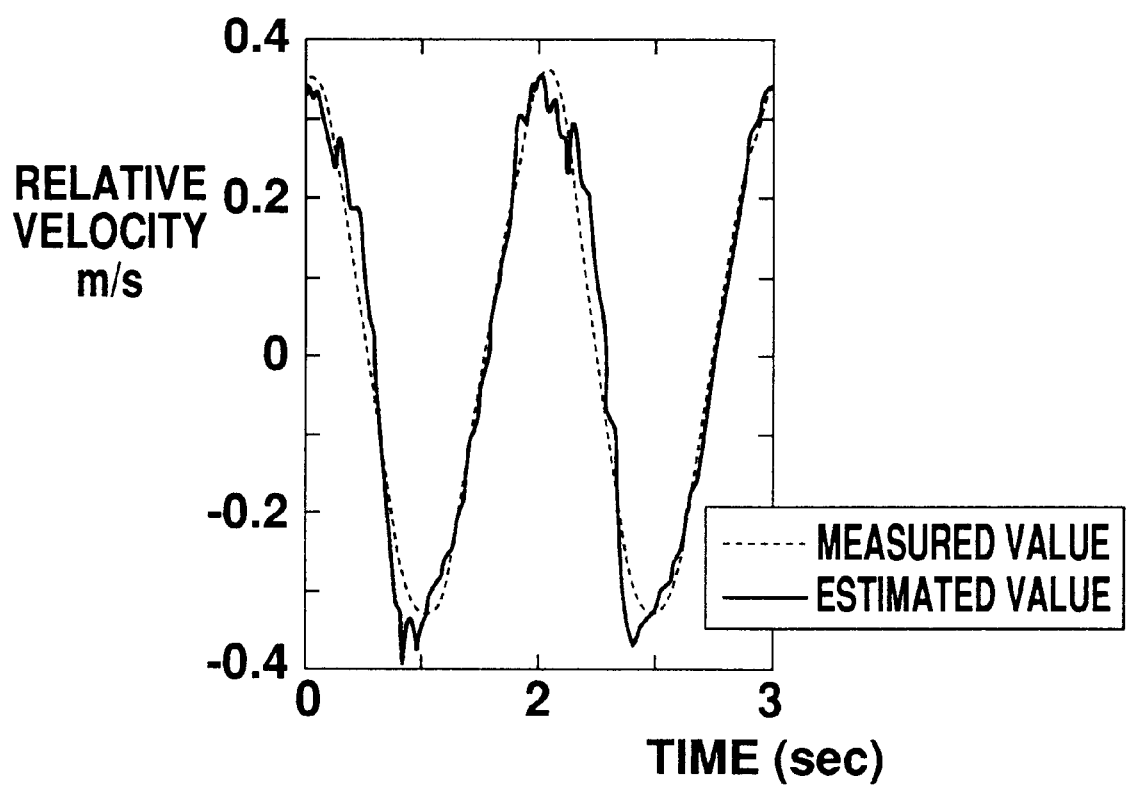
FIG. 7 is an illustration showing the comparison between an estimated value of vehicle vibration computed by the apparatus of the present embodiment and a measured value of vehicle vibration in an actual vehicle test.

FIG. 7 shows estimated relative velocity (continuous line) and actual relative velocity (broken line) between sprung and unsprung structures of a vehicle to which the apparatus of this embodiment is applied when vibrating the vehicle only in the heaving direction.

Figure 8:
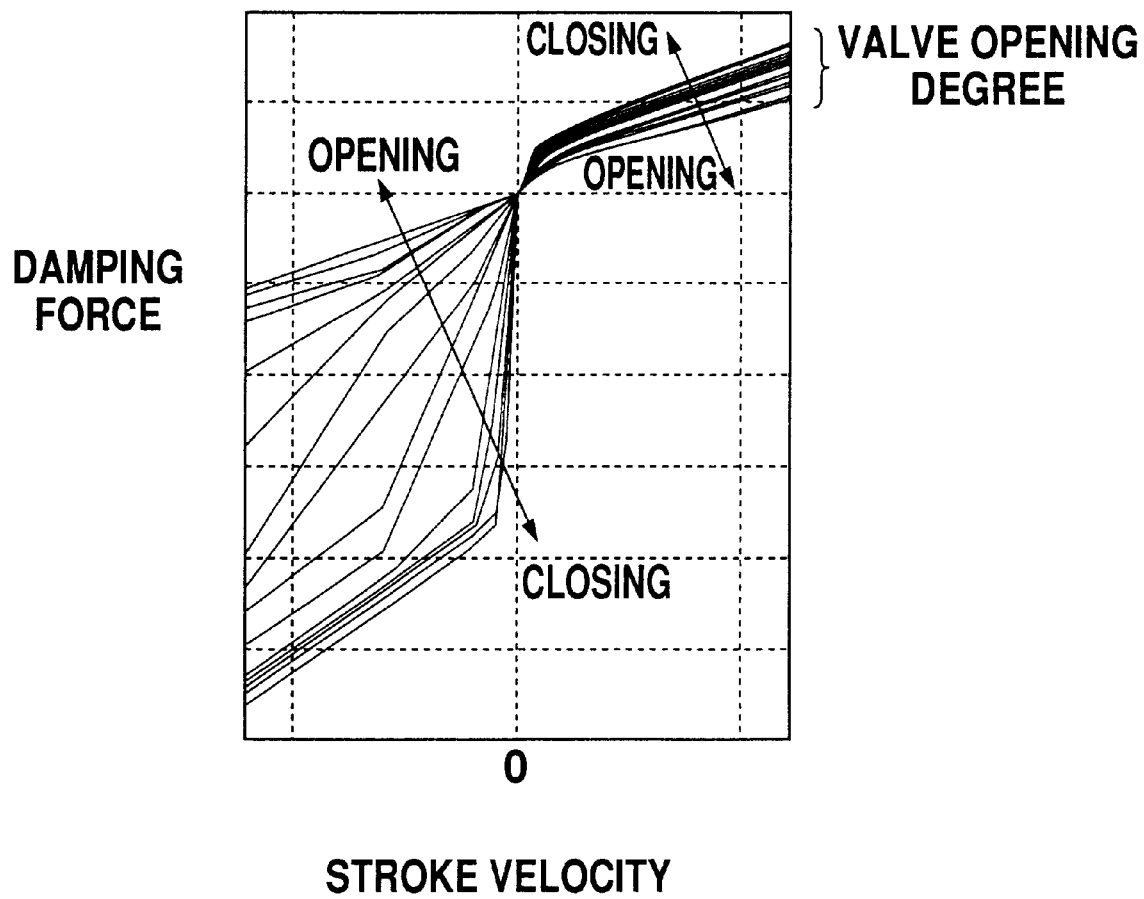
FIG. 8 is an illustration showing an example of damping force characteristics of a shock absorber.

In the case of the above-described equations (7) and (8) or the state observer shown in FIG. 6, a model is analyzed by assuming that an observer gain L is constant. However, when the tilt of the damping force of a shock absorber, that is to say, the damping coefficient of the shock absorber changes greatly depending on the valve opening degree and stroke velocity of the shock absorber as shown in FIG. 8, it is not necessarily possible to estimate a parameter such as a relative velocity at a high accuracy in the case of a state observer with a constant observer gain L, that is to say, in the case of a linear state observer. A Kalman filter is one example of a linear state observers.

Figures 10A, 10B:
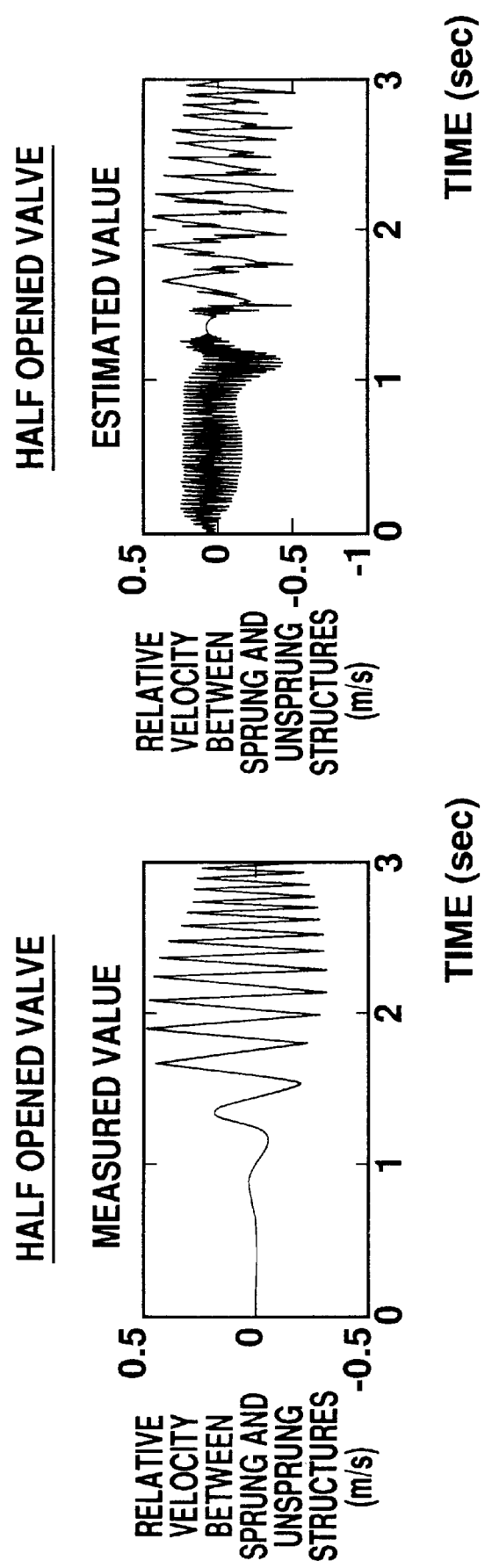
FIG. 10A is an illustration showing a measured value of vehicle vibration.
FIG. 10B is an illustration showing an estimated value of vehicle vibration computed by assuming that the observer gain L is constant.

FIGS. 9A, 9B, 10A and 10B show the results of trial computation of the vibration when using a shock absorber having the damping force characteristics shown in FIG. 8 for the single-wheel model with 2 degrees of freedom shown in FIG. 2. In the case of this trial computation, an observer gain is computed at a damping coefficient of 1,000 N·s/m by using a Kalman filter theory. In this case, vibration is executed by sine waves with a frequency of 0.5 to 5 Hz and an amplitude of 10 mm. FIG. 9A shows the relative velocity between sprung and unsprung structures actually measured at a valve opening degree of 100%. FIG. 9B shows an estimated value under the same condition. FIG. 10A shows a measured value when the valve opening degree is fixed to an intermediate stage, and FIG. 10B shows an estimated value under the same condition. Though the damping coefficient at a valve opening degree of 100% depends on the stroke velocity, it approximately ranges between 1,000 and 2,800 N·s/m. Moreover, the damping coefficient at the intermediate stage of the valve opening degree approximately ranges between 1,700 and 18,000 N·s/m.

In the case of FIGS. 9A and 9B showing values close to the damping coefficient of 1,000 N·s/m which is a design condition, the measured value is almost equal to the estimated value and therefore a preferable result is obtained. In the case of a value separate from the design condition, however, a measured value is different from an estimated value. As described above, when a damping coefficient changes greatly, it is impossible to obtain a high accuracy from estimation by a linear observer, that is to say, a Kalman filter.

The estimation of a relative velocity capable of corresponding to a case in which a damping coefficient varies greatly will be described below.

Figure 11:
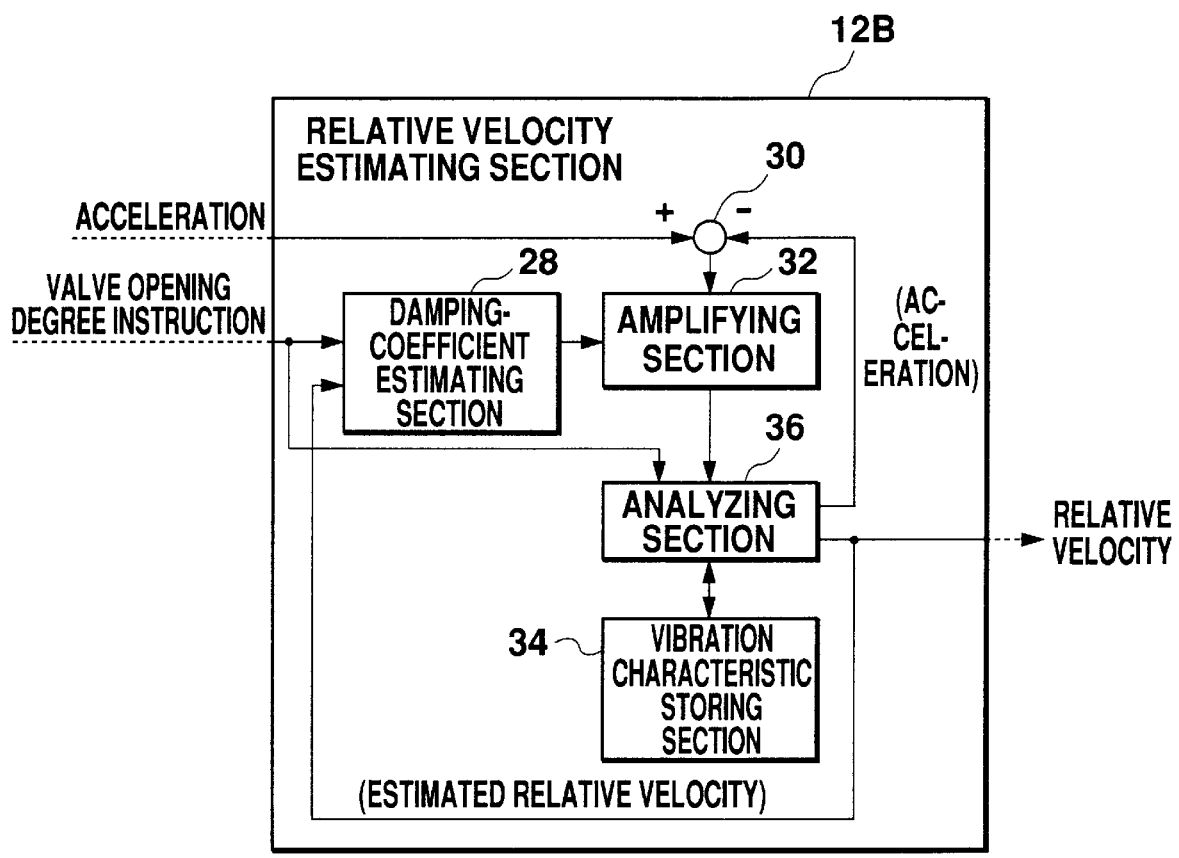
FIG. 11 is a block diagram showing a part of the structure of an embodiment of the present invention.

FIG. 11 shows a relative velocity estimating section 12B which is another preferable structure of the relative velocity estimating section 12 shown in FIG. 3. A damping-coefficient estimating section 28 estimates a damping coefficient based on the previously-stored damping force characteristics in accordance with the relative velocity between sprung and unsprung structures estimated in a previous control cycle, preferably the last control cycle. Moreover, a deviation computing section 30 computes the deviation of the vertical acceleration of the sprung structure computed by the acceleration computing section 10 from the estimated vertical acceleration of the sprung structure. An amplifying section 32 amplifies the deviation at a predetermined rate corresponding to the damping coefficient estimated by the damping-coefficient estimating section 28. A vibration characteristic storing section 34 previously stores vibration characteristics of the vehicle. The vibration characteristics include a sprung mass, unsprung mass, and spring constant and are stored as vibration models in accordance with these constants.

An analyzing section 36 computes the acceleration of a sprung structure and the relative velocity between sprung and unsprung structures in accordance with the amplified acceleration deviation and the stored vibration models. In this case, the computed acceleration is used for operations by the deviation computing section 30.

Specifically, the relative velocity estimating section 12B is a part of the control unit 58. Moreover, the vibration characteristic storing section 34 is a ROM provided for the control unit 58. Furthermore, the deviation computing section 30, amplifying section 32, and analyzing section 36 use a CPU to be operated by a predetermined program and a circuit element for performing predetermined operations.

The arithmetic processing by the relative velocity estimating section 12B will be described below in detail.

When showing the above-described equation of motion of the system in FIG. 2 in the form of a state space expression, the following equation (11) is obtained.

$$X_c' = A_c \cdot x_c + B_c \cdot f_c + G_c \cdot w \quad (11)$$

wherein $x_c = (Zu' \ Zu \ Zw' \ Zw)^T$, w=$Z_r$, and each of $A_c$, $B_c$ and $G_c$ is a coefficient matrix.

This is the state equation of a plant. In this case, $x_c$ denotes a parameter showing a moving state of the above-described system. Moreover, because the vertical acceleration Zu" of a sprung structure is a variable which can be measured in the vehicle shown in FIG. 1, the following equation (12) is obtained as an output equation.

$$y_1 = C_{c1} \cdot x_c + D_{c1} \cdot f_c + v \quad (12)$$

wherein $y_1$=Zu", v is an measurement noise, and each of $C_{c1}$ and $D_{c1}$ is a coefficient matrix.

Moreover, an output equation for computing a relative velocity $y_2$ from a parameter is defined as the following equation (13).

$$y_2 = C_{c2} \cdot x_c \quad (13)$$

wherein $y_2$=Zw'−Zu', and $C_{c2}$ is a coefficient matrix.

When assuming a damping coefficient as Cs and a valve opening degree command as ar, a damping force $f_c$ is shown by the following equation (14).

$$f_c = Cs(Zs', ar)Zs' \quad (14)$$

wherein

Zs=Zw−Zu.

In the equation (14), Cs(Zs', ar) denotes that the damping coefficient Cs is a value determined by a relative velocity Zs and a valve opening degree ar. Moreover, it is assumed that the minimum value of the damping coefficient Cs is $Cs_{min}$ and the maximum value is $Cs_{max}$.

When rewriting the equations (11) to (13) by using the damping coefficient Cs, the following equations (15), (16) and (17) are obtained.

$$x_c' = Av(q) \cdot x_c + G_c \cdot w \quad (15)$$

$$y_1 = C_{V1}(q) \cdot x_c + v \quad (16)$$

$$y_2 = C_{C2} \cdot X_c \quad (17)$$

wherein $$q = \frac{Cs - Cs_{min}}{Cs_{max} - Cs_{min}} \quad (18)$$

$A_V(q) = q \times A_{Vmax} + (1-q) \times A_{Vmin}$ $C_{V1}(q) = q \times C_{V1max} + (1-q) \times C_{V1min}$.

When Cs=$Cs_{max}$, $A_V(q)$ and $C_{V1}(q)$ are assumed as $A_{Vmax}$ and $C_{V1max}$, respectively.

When Cs=$Cs_{min}$, $A_V(q)$ and $C_{V1}(q)$ are assumed as $A_{Vmin}$ and $C_{V1min}$, respectively.

$A_{Vmax} = A_C + Cs_{max} \cdot BcN$ $A_{Vmin} = A_C + Cs_{min} \cdot BcN$ $C_{V1max} = C_{C1} + Cs_{max} \cdot DuN$ $C_{V1min} = C_{C1} + Cs_{min} \cdot DuN$

N=(−1 0 1 0).

Then, a state observer for the above-described system for estimating the above relative velocity is defined by the following equations (19) and (20).

$$X_{ch}' = A_V(q) \cdot x_{ch} + L(q) \cdot (y_1 - C_{V1}(q) \cdot x_{ch}) \quad (19)$$

$$y_{2h} = C_{V2}(q) \cdot x_{ch} \quad (20)$$

In this case, $x_{ch}$ denotes an estimated signal of a parameter $x_c$ of a system to be computed by the defined state observer. Moreover, $y_{2h}$ denotes an estimated signal of a relative velocity $y_2$.

L(q) in the equation (7) shows an observer gain and it is defined as shown below. It is assumed that the stationary Kalman filter gain for the equations (15) and (16) when a damping coefficient is equal to the minimum value $Cs_{min}$ is $L_{min}$ and the stationary Kalman filter gain for the equations (15) and (16) when the damping coefficient is equal to the maximum value $Cs_{max}$ is $L_{max}$. Moreover, for observer gains computed at these end points, observer gains are set in accordance with the following equation (21) at points other than the end points:

$$L(q) = q \times L_{max} + (1-q) \times L_{min} \quad (21)$$

In order to compute the estimated value $y_{2h}$ of the relative velocity between sprung and unsprung structures in accordance with the observers defined by the equations (19) and (20), it is necessary to obtain fixed coefficient matrixes $A_c$, $B_c$, $G_c$, $C_{c1}$, $C_{c2}$ and $D_{c1}$ depending on the characteristic value of a system, the vertical acceleration $y_1$ of a sprung structure, and the damping force $f_c$. In this case, a coefficient matrix can easily be obtained from the mass of a sprung structure and a spring constant similarly to the above case in which the observer gain is constant and the acceleration $y_1$ can be obtained from an acceleration sensor provided for a sprung structure. Moreover, the damping force $f_c$ is obtained by using the previously-measured damping force characteristics of a shock absorber shown in FIG. 8. Though a valve opening degree can actually be measured, this embodiment uses the valve opening degree command ar.

Moreover, it is possible to obtain the damping force $f_c$ and damping coefficient Cs of a shock absorber based on the characteristic diagram in FIG. 8 by using the estimated value $y_{2h}$ of the relative velocity between sprung and unsprung structures one control cycle before. Furthermore, it is possible to obtain q from the equation (18) by using the damping coefficient Cs and obtain the observer gain L(q) from the equation (21).

Thus, it is possible to estimate the relative velocity $y_{2h}$ between sprung and unsprung structures from the equations (19) and (20).

In the case of detection of a sprung acceleration, it is possible to compute the acceleration of the chassis-side setting point of the shock absorber 56 by arranging three acceleration sensors so that they are not located on the same straight line.

FIGS. 12A, 12B, 13A and 13B show the results of trial computation of the relative velocity between sprung and unsprung structures of the single-wheel model with two degrees of freedom shown in FIG. 2 by using the above state observers. Moreover, FIG. 8 shows the damping characteristics of a shock absorber.

Figures 13A, 13B:
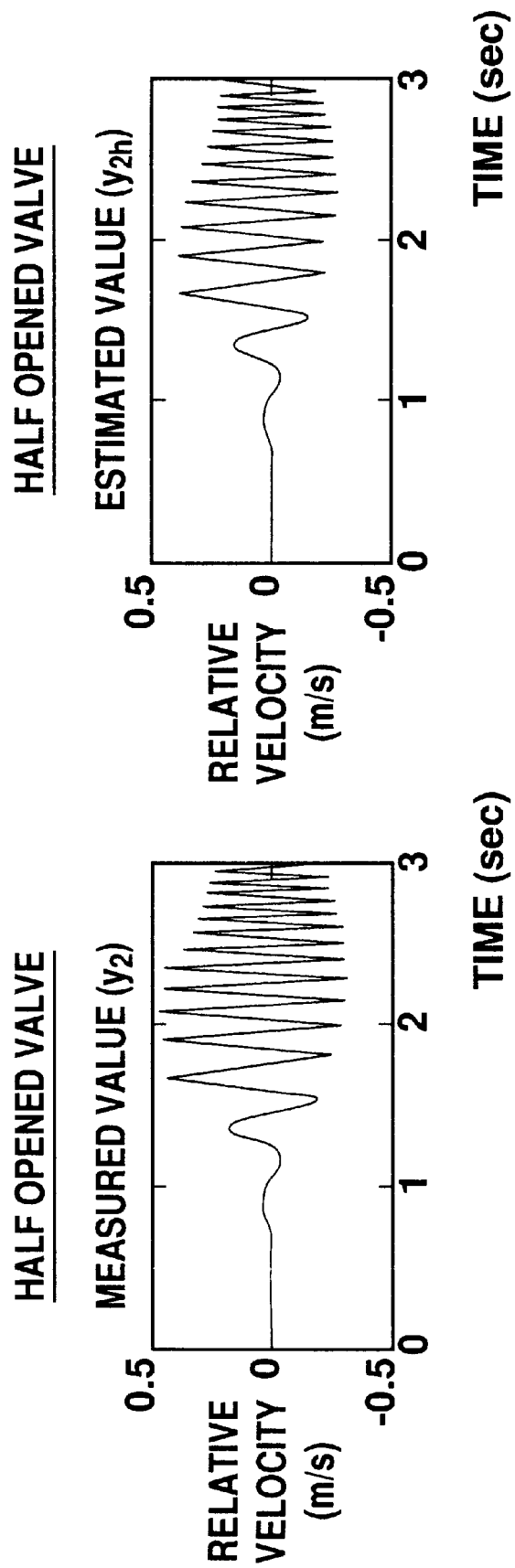
FIG. 13A is an illustration showing a measured value of vehicle vibration.
FIG. 13B is an illustration showing an estimated value of vehicle vibration computed by the apparatus of the present embodiment for changing the observer gain L(q) in accordance with the damping coefficient Cs.

FIGS. 12A, 12B, 13A and 13B show trial computation results when computing the observer gain L(q) in accordance with the damping coefficient Cs. The observer gain L(q) is computed by using the stationary Kalman filter theory at damping coefficients of 1,000 N·s/m and 65,600 N·s/m. Moreover, FIGS. 12A and 12B show the case of a valve opening degree of 100%, and FIGS. 13A and 13B show the case of fixing a valve opening degree to an intermediate stage. FIGS. 12A and 13A show measured values, and FIGS. 12B and 13B show estimated values. The damping coefficients in the case of FIGS. 12A and 12B show approx. 1,000 to 2,800 N·s/m and those in the case of FIGS. 13A and 13B show approx. 1,700 to 18,000 N·s/m. Moreover, sine-wave vibration is executed at a frequency of 0.5 to 5 Hz and an amplitude of 10 mm. From these trial-computation results, it is found that a preferable estimation result can be obtained even if a damping coefficient changes greatly.

Figure 14:
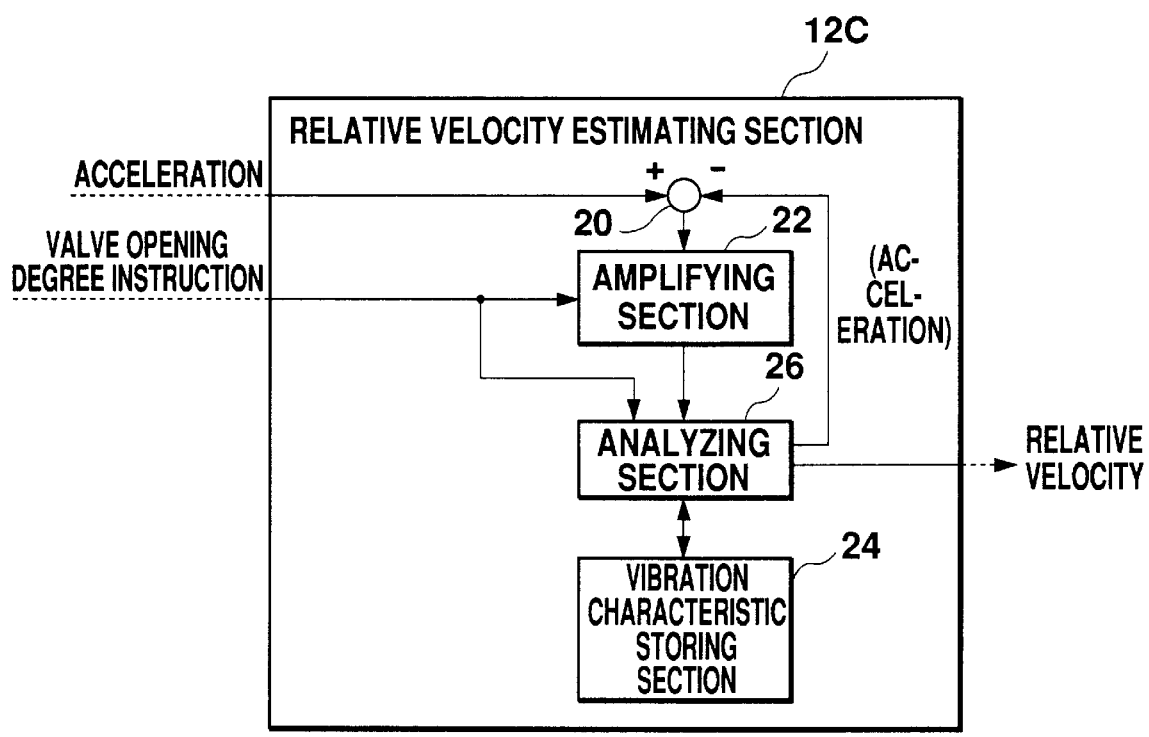
FIG. 14 is a block diagram showing a part of the structure of an embodiment of the present invention.

FIG. 14 shows a relative velocity estimating section 12c which is still another preferable structure of the relative velocity estimating section 12 sown in FIG. 3. In the case of the relative velocity estimating section 12, a deviation computing section 20 first computes the deviation of the vertical acceleration of a sprung structure computed by the acceleration computing section 10 from the estimated vertical acceleration of the sprung structure. A deviation amplifying section 22 amplifies the deviation at a predetermined rate corresponding to the above valve opening degree instruction. Moreover, the vibration characteristics of the vehicle are previously stored in a vibration characteristic storing section 24. The vibration characteristics include a sprung mass, unsprung mass, and spring constant and are stored as vibration models in accordance with these constants.

An analyzing section 26 computes the acceleration of a sprung structure and the relative velocity between sprung and unsprung structures in accordance with the amplified acceleration deviation and the stored vibration models. In this case, the computed acceleration is used for operations by the deviation computing section 20.

Specifically, the relative velocity estimating section 12C is a part of the control unit 58. Moreover, the vibration characteristic storing section 24 is a ROM provided for the control unit 58. Furthermore, the deviation computing section 20, amplifying section 22, and analyzing section 36 use a CPU to be operated by a predetermined program and a circuit element for performing predetermined operations.

The arithmetic processing by the relative velocity estimating section 12C will be described below in detail.

The relative velocity estimating section 12C computes an observer gain L(p) in accordance with only the valve opening degree command ar. The observer gain L(p) is computed in accordance with the following equations (22) and (23).

$$L(q) = p \times L_{max} + (1-p) \times L_{min} \quad (22)$$

wherein $$p = \frac{ar - ar_{min}}{ar_{max} - ar_{min}} \quad (23)$$

In this case, $ar_{min}$ denotes a valve opening degree command when fully opening a valve and $ar_{max}$ denotes a valve opening degree command when fully closing the valve.

Other operations are the same as those carried out by the relative velocity estimating section 12B shown in FIG. 11.

FIGS. 15A, 15B, 16A and 16B show the results of trial computation of the relative velocity between sprung and unsprung structures of the single-wheel model with two degrees of freedom shown in FIG. 2 by using the above observers. The damping characteristics of a shock absorber are shown in FIG. 8.

Figures 16A, 16B:
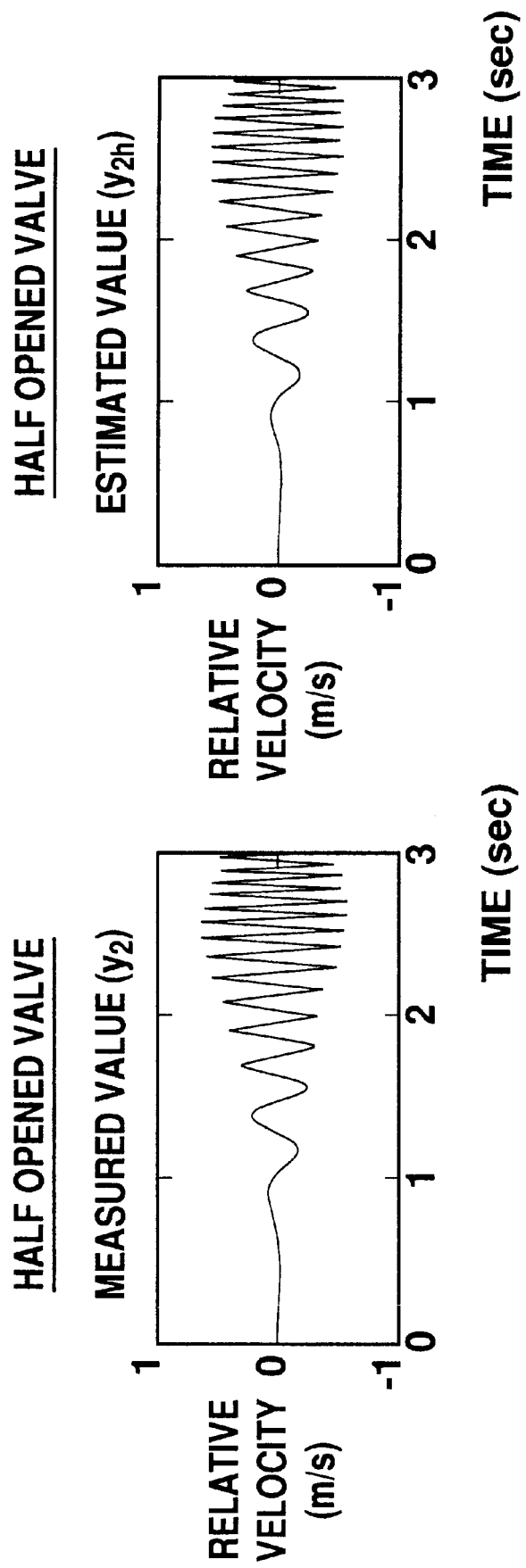
FIG. 16A is an illustration showing a measured value of vehicle vibration.
FIG. 16B is an illustration showing an estimated value of vehicle vibration computed by the apparatus of the present embodiment for changing the observer gain L(p) in accordance with the valve opening degree ar.

FIGS. 15A, 15B, 16A and 16B show the results of trial computation the observer gain L(p) in accordance with the valve opening degree command ar. The observer gain L(p) is computed at damping coefficients of 1,000 N·s/m and 65,600 N·s/m by using the stationary Kalman filter theory. Moreover, FIGS. 15A and 15B show the case of a valve opening degree of 100%, and FIGS. 16A and 16B show the case of fixing the valve opening degree to an intermediate stage. FIGS. 15A and 16A show measured values, and FIGS. 15B and 16B show estimated values. The damping coefficients in the case of FIGS. 15A and 15B show approx. 1,000 to 2,800 N·s/m and those in the case of FIGS. 16A and 16B show approx. 1,700 to 6,500 N·s/m. Moreover, sine-wave vibration is executed at a frequency of 0.5 to 5 Hz and a amplitude of 10 mm. From these trial computation results, it is found that a preferable estimation result can be obtained even if a damping coefficient varies greatly.

Figure 17:
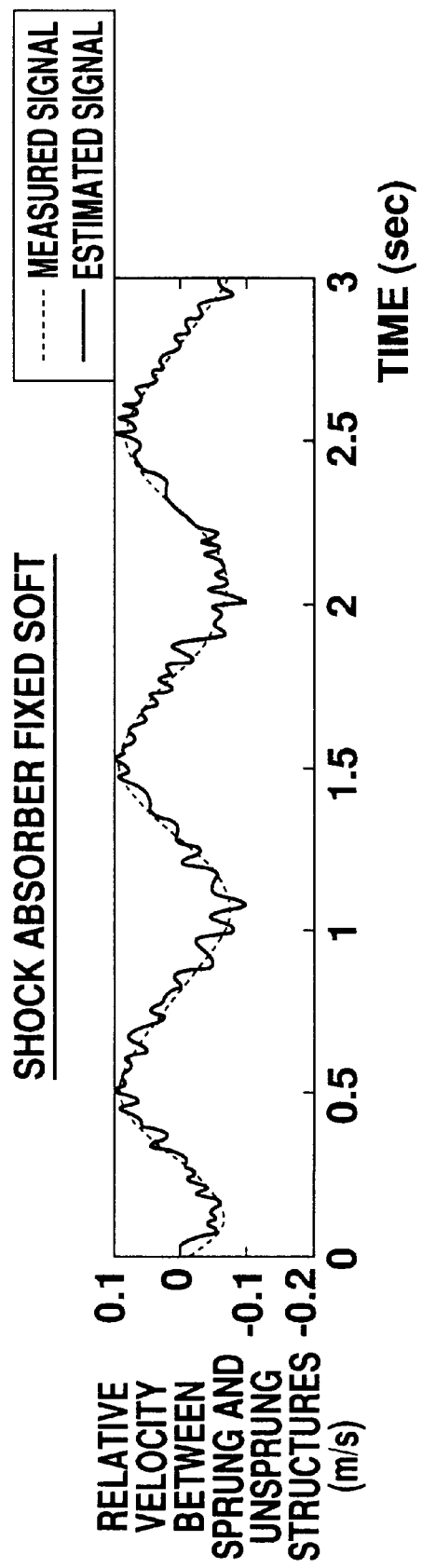
FIG. 17 is an illustration showing the comparison between an estimated value of vehicle vibration computed by the apparatus of the present embodiment for changing the observer gain L(q) in accordance with the damping coefficient Cs and a measured value of vehicle vibration in an actual vehicle test.
Figure 18:
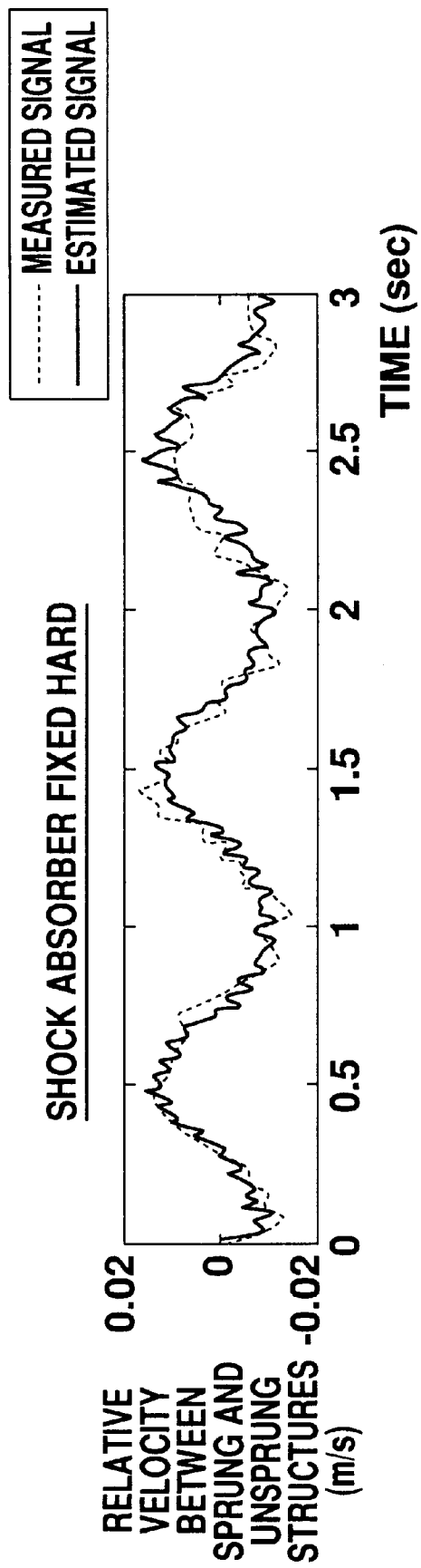
FIG. 18 is an illustration showing the comparison between an estimated value of vehicle vibration computed by the apparatus of the present embodiment for changing the observer gain L(q) in accordance with the damping coefficient Cs and a measured value of vehicle vibration in an actual vehicle test.

In FIGS. 17 and 18, the results of vibration tests on the actual vehicle shown in FIG. 1 in its heaving direction are shown by continuous lines. For estimation of a relative velocity, an observer gain is L(q) of the equation (21) computed in accordance with a damping coefficient and computed at damping coefficients of 1,000 N·s/m and 65,600 N·s/m by using the stationary Kalman filter theory. FIG. 17 shows the case of a valve opening degree of 100%, and FIG. 18 shows the case of a valve opening degree of 0%. The damping coefficient reaches approx. 1,000 to 2,800 N·s/m in the case of a valve opening degree of 100% and 65,600 N·s/m at most in the case of a valve opening degree of 0%. Moreover, sine-wave vibration is executed at an amplitude of 10 mm and a frequency of 1 Hz. The broken lines in FIGS. 17 and 18 denote the values obtained by differentiating the outputs of vehicle height sensors and show actual relative velocities between sprung and unsprung structures. From FIGS. 17 and 18, it is found that a preferable estimation result can be obtained even if a damping coefficient varies greatly.

Each of the above embodiments estimates a damping force from the information on valve opening degree or the relative velocity between sprung and unsprung structures computed in accordance with the information for valve opening degree and in a previous control cycle. Therefore, a high estimation accuracy is obtained. Moreover, by estimating the above relative velocity in accordance with an estimated value of the above damping force, a more-accurate relative velocity can be obtained.

Furthermore, by measuring only the acceleration of a sprung structure in accordance with previously-measured damping force characteristics of a shock absorber and a valve opening degree instruction, it is possible to estimate the above relative velocity and moreover, to obtain a damping force in accordance with the estimated relative velocity. Therefore, no pressure sensor or vehicle height sensor in a shock absorber or no unsprung acceleration sensor is necessary. Thus, it is possible to decrease the cost and vehicle weight.

What is claimed is:

1. A sprung- and unsprung-structure relative-velocity computing apparatus for computing a relative velocity between a sprung structure and an unsprung structure of a vehicle connected through a shock absorber capable of varying damping forces by adjusting a valve opening degree of a fluid channel and a spring, said apparatus comprising:
   acceleration computing means for computing a vertical acceleration of said sprung structure, and
   relative-velocity estimating means for estimating the relative velocity between said sprung structure and said unsprung structure of said vehicle in accordance with said computed acceleration and a valve-opening-degree command value for adjusting said valve opening degree.

2. The sprung- and unsprung-structure relative-velocity computing apparatus according to claim 1, wherein said relative-velocity estimating means is provided with damping-force characteristic storing means for storing a damping-force characteristic of the shock absorber for a valve-opening-degree command value and stroke velocity, said damping-force characteristic being previously measured, damping-force estimating means for estimating a damping force based on said previously stored damping-force characteristic in accordance with said valve opening degree and the relative velocity estimated in a previous control cycle, and estimate-computing means for estimate-computing the relative velocity between said sprung structure and the unsprung structure of said vehicle in accordance with a detected acceleration and said estimated damping force.

3. The sprung- and unsprung-structure relative-velocity computing apparatus according to claim 2, wherein said acceleration computing means is an acceleration sensor for detecting an acceleration of an attachment point of the shock absorber of said sprung structure.

4. The sprung- and unsprung-structure relative-velocity computing apparatus according to claim 2, wherein said acceleration computing means has a plurality of acceleration sensors provided for the sprung structure and an attachment-point acceleration computing means for computing an acceleration of at least one attachment point of the shock absorber of said sprung structure in accordance with the acceleration detected by said acceleration sensors.

5. The sprung- and unsprung-structure relative-velocity computing apparatus according to claim 1, wherein said relative-velocity estimating means is provided with vibration characteristic storing means for previously storing a vibration characteristic of said vehicle, deviation computing means for computing a deviation of a detected acceleration from an estimated vertical acceleration of said sprung structure, amplifying means for amplifying a deviation in accordance with said valve-opening-degree command value, and vibration analyzing means for estimating the vertical acceleration of said sprung structure and the relative velocity between sprung and unsprung structures.

6. The sprung- and unsprung-structure relative-velocity computing apparatus according to claim 5, wherein said acceleration computing means is an acceleration sensor for detecting an acceleration of an attachment point of the shock absorber of said sprung structure.

7. The sprung- and unsprung-structure relative-velocity computing apparatus according the claim 5, wherein said acceleration computing means has plurality of acceleration sensors provided for the sprung structure and an attachment-point acceleration computing means for computing an acceleration of at least one attachment point of the shock absorber of said sprung structure in accordance with the acceleration detected by said acceleration sensors.

8. The sprung- and unsprung-structure relative-velocity computing apparatus according to claim 1, wherein said relative velocity estimating means is provided with vibration characteristic storing means for previously storing a vibration characteristic of said vehicle, deviation computing means for computing a deviation of a detected acceleration from an estimated vertical acceleration of said sprung structure, damping-coefficient estimating means for estimating a damping coefficient of said shock absorber in accordance with said valve-opening-degree command value and the relative velocity estimated in a previous control cycle, amplifying means for amplifying said deviation of said detected acceleration in accordance with an estimated damping coefficient, and vibration analyzing means for estimating the vertical acceleration of said sprung structure and the relative velocity between sprung and unsprung structures.

9. The sprung- and unsprung-structure relative-velocity computing apparatus according to claim 8, wherein said acceleration computing means is an acceleration sensor for detecting the acceleration of an attachment point of the shock absorber of said sprung structure.

10. The sprung- and unsprung-structure relative-velocity computing apparatus according to claim 8, wherein said acceleration computing means has a plurality of acceleration sensors provided for the sprung structure and an attachment-point acceleration computing means for computing an acceleration of at least one attachment point of the shock absorber of said sprung structure in accordance with the acceleration detected by said acceleration sensors.

* * * * *